United States Patent [19]

Rosendahl et al.

[11] 3,929,720

[45] Dec. 30, 1975

[54] FLAME RESISTANT COMPOSITION OF MATTER OF HIGH MOLECULAR WEIGHT LINEAR POLYESTERS

[75] Inventors: Friedrich-Karl Rosendahl; Herbert Pelousek, both of Dormagen; Hans Niederprüm, Monheim, all of Germany

[73] Assignee: Bayer Aktiengesellschaft, Leverkusen, Germany

[22] Filed: Apr. 19, 1974

[21] Appl. No.: 462,497

[30] Foreign Application Priority Data

Apr. 19, 1973 Germany............................ 2320007

[52] U.S. Cl....... 260/40 P; 260/45.7 S; 260/45.9 R; 260/556 F; 260/DIG. 24
[51] Int. Cl.[2].................... C08K 5/42; C08L 67/02
[58] Field of Search.... 260/45.7 S, 45.9 R, DIG. 24, 260/556 F, 40 P

[56] References Cited
UNITED STATES PATENTS 3,310,532   3/1967   Kazama et al.................. 260/45.7 S

FOREIGN PATENTS OR APPLICATIONS 857,906   1/1961   United Kingdom............. 260/556 F
2,024,909   12/1971   Germany.......................... 260/556 F

*Primary Examiner*—Donald E. Czaja
*Assistant Examiner*—S. M. Person
*Attorney, Agent, or Firm*—Plumley & Tyner

[57] ABSTRACT

A flame resistant composition of matter and formed articles, especially fibers and filaments, made therefrom comprising a high molecular weight linear polyester and at least one perfluorinated aliphatic sulfonamide compound.

7 Claims, No Drawings

FLAME RESISTANT COMPOSITION OF MATTER OF HIGH MOLECULAR WEIGHT LINEAR POLYESTERS

This invention relates to flame-resistant compositions of matter and formed products therefrom of high molecular weight linear polyesters which contain certain perfluorinated sulphonamide compounds as flame-retarding agents. It relates particularly to flame resistant filaments and fibres of this kind.

It is known that the flammability and combustibility of formed products which have been produced from high molecular weight linear polyesters, in particular filaments and fibres, can be reduced by adding certain flame-retarding substances to the polyesters. Compounds previously used for this purpose include, for example, antimony trioxide, phosphorus compounds and organic chloro- or bromo-compounds. The flame-retarding effect produced by adding the above substances was in many cases insufficient furthermore, it has been found that when formed products, e.g., filaments are produced from polyesters which contain organic chloro- or bromo-compounds as flame-retarding additives, hydrogen chloride or hydrogen bromide is split off which, by initiating degradation processes seriously affects the properties of the filaments.

It is an object of this invention to avoid the difficulties encountered in the production of flame-resistant polyesters and formed products therefrom. This object is accomplished by the addition of certain perfluorinated aliphatic sulphonamides to the polyesters as flame-retarding agents.

This invention therefore relates to a composition of matter comprising a high molecular weight linear polyester and at least one compound of the general formula

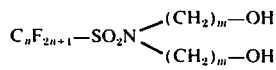  (I)

wherein
n represents an integer of from 1 to 10 and
m represents an integer of from 2 to 10.

The composition preferably contains quantities of 0.1 to 30% by weight, preferably 0.1 to 5% by weight of the flame-retardant agent.

The following compounds, for example, have proved to be particularly suitable:

  (II)

and

  (III).

This type of compound may be utilized as a fire-retardant for the compositions and the formed products made therefrom, particularly filaments and fibres.

The flame resistant formed products are obtained by adding 0.1 to 30% by weight of compounds of the above general formula to high molecular weight linear polyesters and then subjecting the polyesters to a forming process.

Polyesters suitable for the treatment according to the present invention are any high molecular weight linear polyesters which can be worked up into formed products in particular into filaments and fibres, i.e., they have such molecular weight that they are filament-forming. For example, of particular interest are the polyesters based on terephthalic acid and glycols. Both homo- and co-polymers are suitable, and both the acid portion and the glycol portion of the polymers may be varied. Of particular interest are the polyesters preferred from terephthalic acid and ethylene glycol, terephthalic acid and cyclohexane-1,4-dimethanol, terephthalic acid and butane-1,4-diol, and also polyesters of terephthalic acid and mixtures of the above-mentioned glycols and polyesters of terephthalic acid and isophthalic acid with the above-mentioned glycols.

The perfluorinated aliphatic sulphonamides, of general formula (I), which may be used as flame-retarding additives, have been described in Ann. 1973, Volume 1, pages 11 – 19.

It has been found that when these perfluorinated compounds are used as flame-retarding agents in the processing, e.g., spinning, of polyesters to produce formed products, e.g., fibres, no elimination of hydrofluoric acid takes place so that the properties of the products are not damaged.

Addition of the flame retarding agents to the polyesters may be carried out in known manner by various methods. For example, the perfluorinated sulphonamides may be made up into a solution, (for example in dioxane at from 40°C to 50°C), to which a polyester granulate is then added, the dioxane may then be removed under vacuum, e.g., in a rotatory evaporator at a temperature of 60°C. A coated granulate is obtained which may be used for spinning, after it has been dried in the usual manner.

The additives may also be applied to the polyester granulate by roller-coating. Alternatively, the flame-retarding additive and polyester granulate may be mixed, in the desired proportions, and introduced into a two-shaft extruder in which the material is melted and thereby mixed; after extrusion it may be either granulated or spun directly.

It is preferred to incorporate the additives in quantities of 0.1 to 30% by weight, based on the whole mixture, however, it is normally sufficient to add 0.1 to 5% by weight. It has been found that efficient flame-resistance may be obtained even with relatively small quantities of additive.

The polyester granulate, which has been mixed with the flame-retarding agent by one of the methods mentioned above, may be converted into a formed product in known manner, for example, it may be spun to form filaments in any conventional spinning apparatus.

The combustion test used in the examples to determine the LOI index is carried out as follows:

A sample is placed vertically in a combustion tube through which a mixture of oxygen and nitrogen is passed at a specified rate and the sample is ignited with a gas flame from above.

The ratio of nitrogen to oxygen is then continuously varied until the sample burns uniformly with a minimum flame. The combustion coefficient (LOI index) — n — is calculated as follows:

$$n = \frac{\text{Liter of } O_2}{\text{Liter of } O_2 + \text{Liter of } N_2} \times 100$$

The higher the LOI index (proportion of oxygen) the lower is the combustibility of a substance.

The LOI index, n, is thus an indication of the percentage of oxygen in the oxygen/nitrogen mixture which is just sufficient to enable a vertically placed sample to burn uniformly from the top downwards.

The following examples are to further illustrate the invention without limiting it.

EXAMPLE 1

5 kg of polyester granulate (polyethylene terephthalate, intrinsic viscosity 0.65 dl/g in a 60:40 mixture of phenol and tetrachloroethane) were sintered with 50 g of $C_4F_9SO_2N(CH_2-CH_2-OH)_2$ for 2 hours at 85°C. The resulting coated granulate was then spun at a temperature of 285°C and a spinning velocity of 1100 m/min (spinning titre detex 240/18). After the usual stretching over a heated roller (85°C, and heating block (160°C), at a streching ratio of 1:3.6 (at a stretching rate of 800 m/min), a polyester filament yarn (titre above dtex 66/18) with the following textile properties is obtained:

Tensile strength: 42 Rkm (break km)
Elongation on tearing: 28%
Boiling shrinkage: 6.5%
LOI index: $n = 32$ In comparison, a yarn produced in a similar way from untreated polyester granulate LOI index: $n = 28$.

EXAMPLE 2

A polyester granulate of polyethylene terephthalate (intrinsic viscosity 0.65 dl/g) was first sintered for 30 minutes with a wax (0.1%) (e.g., Hoechst Wachs-OP) at 70°C, in a manner analogous to Example 1, and then treated for 2 hours with 5% by weight, based on the mixture, of finely ground $C_8F_{17}SO_2N(CH_2CH_2OH)_2$ as flame-retarding agent. After the usual spinning and stretching procedures, as in Example 1, a polyester silk with the following textile properties is obtained:

Tensile strength: 36 Rkm (break km)
Elongation on tearing: 30%
Boiling shrinkage: 7%
LOI index: $n = 34$ In comparison, a polyester silk produced in a similar way from untreated polyester granulate, LOI index: $n = 28$.

What we claim is:

1. A flame-resistant composition of matter having an LOI Index of at least 32 comprising a high molecular weight linear polyester and at least one compound of the general formula

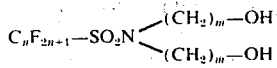

wherein
 $n$ represents an integer of from 1 to 10 and
 $m$ represents an integer of from 2 to 10.

2. The composition of claim 1, wherein said compound is present in an amount of 0.1 to 30% by weight, based on said composition.

3. The composition of claim 1, wherein said compound is present in an amount of 0.1 to 5% by weight, based on said composition.

4. The composition of claim 1, wherein said polyester is based on (a) a dicarboxylic acid selected from the group consisting of terephthalic acid, isophthalic acid and a mixture thereof and (b) a glycol selected from the group consisting of ethylene glycol, cyclohexane-1,4-dimethanol, butane-1,4-diol and a mixture thereof.

5. The composition of claim 1, wherein said compound is $C_4F_9-SO_2-N(CH_2-CH_2-OH)_2$ or $C_8H_{17}SO_2-N(CH_2-CH_2OH)_2$.

6. Formed products comprising a composition as claimed in claim 1.

7. Filaments and fibres comprising a composition as claimed in claim 1.

* * * * *